United States Patent
Chen

(10) Patent No.: US 8,155,330 B2
(45) Date of Patent: Apr. 10, 2012

(54) DYNAMIC AUDIO PARAMETER ADJUSTMENT USING TOUCH SENSING

(75) Inventor: Shaohai Chen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 488 days.

(21) Appl. No.: 12/415,842

(22) Filed: Mar. 31, 2009

(65) Prior Publication Data

US 2010/0246855 A1 Sep. 30, 2010

(51) Int. Cl.
*H03G 3/20* (2006.01)
*G10L 15/00* (2006.01)
(52) U.S. Cl. .......................... 381/57; 704/258
(58) Field of Classification Search .............. 381/57–58, 381/104–107; 257/254, 416; 704/258, 275
See application file for complete search history.

(56) References Cited

U.S. PATENT DOCUMENTS

| 6,788,798 | B1 | 9/2004 | Backman | |
|---|---|---|---|---|
| 8,050,926 | B2 * | 11/2011 | Huang | 704/258 |
| 8,081,765 | B2 * | 12/2011 | Yu | 381/57 |
| 2001/0014161 | A1 | 8/2001 | Baiker et al. | |

FOREIGN PATENT DOCUMENTS

TW 097142108 * 10/2008

* cited by examiner

*Primary Examiner* — Calvin Lee
(74) *Attorney, Agent, or Firm* — Blakely, Sokoloff, Taylor & Zafman LLP

(57) ABSTRACT

An audio communications device has a handset in which a touch sensing ear piece region is coupled to an acoustic leakage analyzer. The acoustic leakage analyzer is to analyze signals from the touch sensing ear piece region and on that basis adjust an audio processing parameter. The latter configures an audio processor which generates an audio receiver input signal for the device. Other embodiments are also described and claimed.

5 Claims, 4 Drawing Sheets

DYNAMIC AUDIO PARAMETER ADJUSTMENT USING TOUCH SENSING

An embodiment of the invention relates to techniques for adjusting audio parameters in a communications device for improving tolerance to acoustic leakage. Other embodiments are also described.

BACKGROUND

People have long been accustomed to making telephone calls using a handset whose earpiece portion the user typically presses up against her ear (in order to better hear the voice of the other party.) As mobile phones became prevalent, the acoustic system that delivers sound to the user's ear was faced with a variety of environmental conditions, in particular varying levels of background noise. A mobile phone might be used in a quiet room until the user walks outside to a noisy street. The intelligibility of sound from the earpiece (produced by the so-called receiver or earpiece loud speaker) is reduced when there is a raised ambient noise level. In addition, it is typical for the user in that case to want to press the handset more firmly to his ear. If the receiver is too loud, the user may pull back or lift off the handset to move the earpiece away from her ear.

The earpiece has been conventionally designed in such a way that it produces good sound pressure and quality, when it is mostly sealed or in a particular sealing condition against the user's ear. If there is a larger gap, that is a larger leak between the earpiece and the user's ear, this usually causes a significant weakening of the sensed sound pressure. Manufacturers try to ensure that the volume and frequency distribution of the sound from the earpiece is in accordance with their specification, in actual or real operating conditions where the earpiece is rarely completely sealed against the user's ear. In other words, the handset has to have the ability to tolerate or adapt to such acoustic leakage in its earpiece region.

Typically, several techniques have been used to improve acoustic leak tolerance. In one technique, a loose coupling is arranged to the receiver (which produces the sound waves in the earpiece region). The receiver in that case is acoustically loaded by a relatively large volume that is as large as possible. Another way to improve leak tolerance may be to lower the acoustic output impedance of the earpiece arrangement by using an acoustic return path.

In another solution, an acoustic sensor is added to measure the sound pressure that is present in the acoustic interspace between the earpiece region and the user's ear. A control circuit compensates for the measured loss in sound pressure that is caused by an acoustic leak, to keep the subjective impression of the loudness level (and thus the intelligibility of the speech signal), always approximately in the same range. The subjective impression of the loudness level depends not only on the total power of the acoustic signal, but also on the distribution of the energy within its signal spectrum.

SUMMARY

In accordance with an embodiment of the invention, the handset of an audio communications device has a touch sensing earpiece region. An acoustic leakage analyzer is coupled to the touch sensing earpiece region, to analyze signals from the region and on that basis adjust an audio processing parameter (that is used by an audio processor to generate an audio receiver input signal for the device). This allows the device to automatically adjust the audio processing parameter to compensate for acoustic leakage between the user's ear and the earpiece region.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
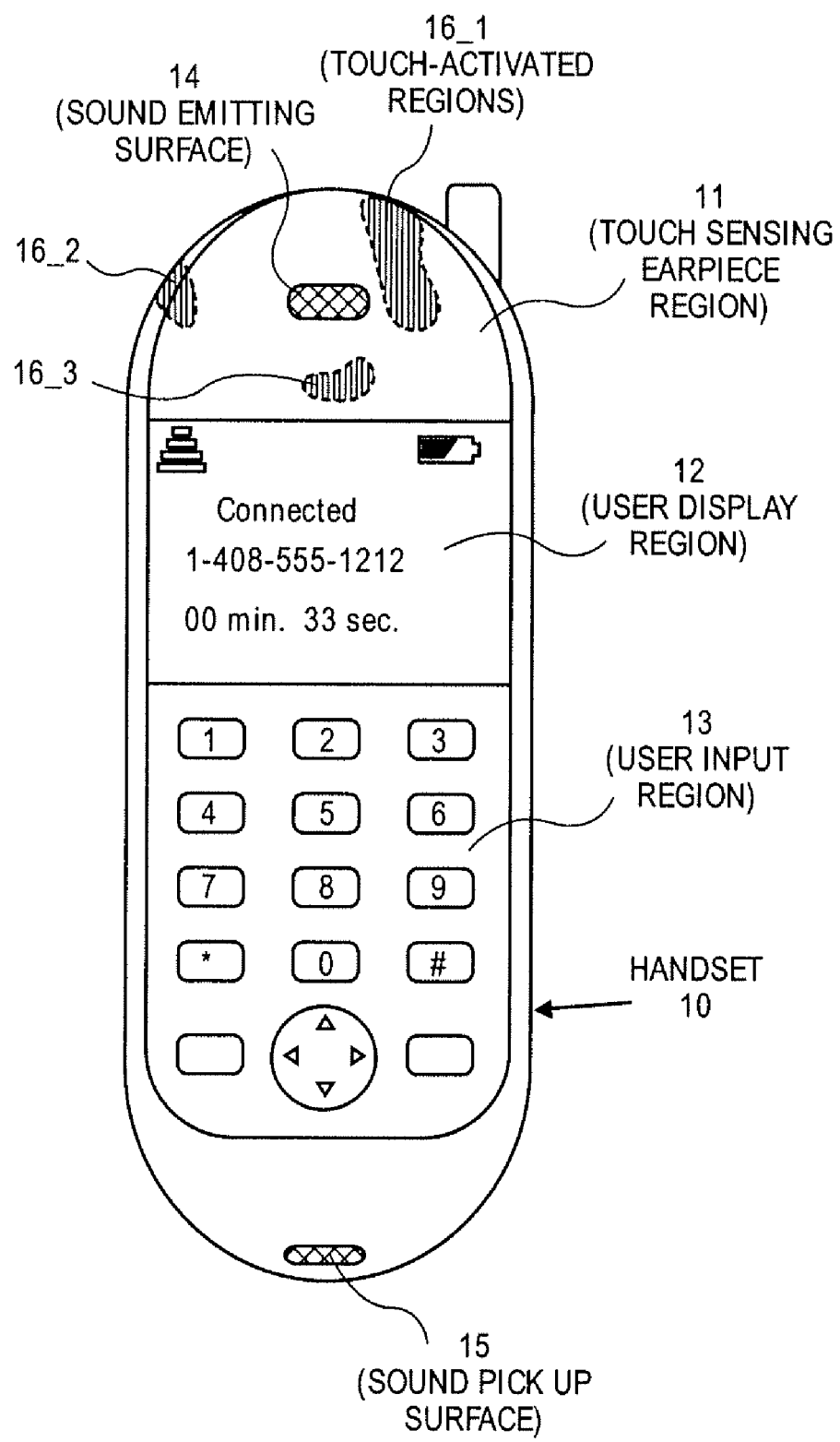
FIG. 1 shows an example audio communications device in use, including an imprint of the user's ear activated in the touch sensing earpiece region.
Figure 2:
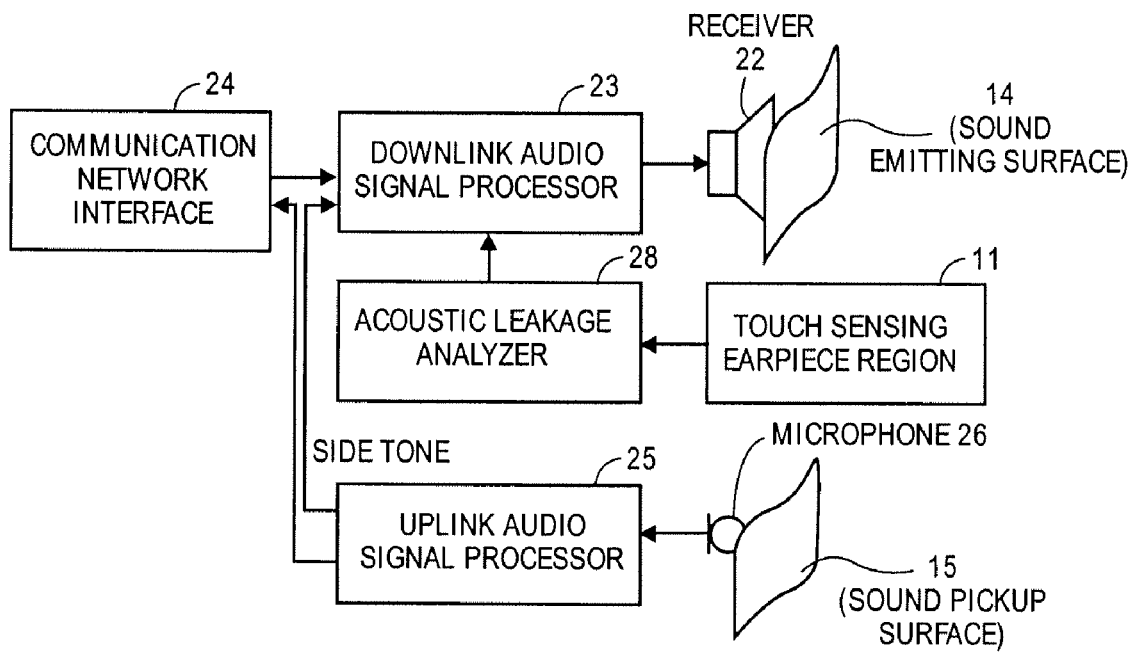
FIG. 2 is a block diagram of some relevant functional components of the communications device.

FIG. 1 shows an example of a handset 10 of an audio communications device in use. Some relevant physical and functional components of the device are shown in FIG. 2. The handset 10 has a housing in which are integrated a touch sensing earpiece region 11 located above a user display region 12. The earpiece 11 includes a sound emitting surface 14. The sound emitting surface 14 may be part of or may hide a receiver 22 (also referred to as an earpiece speaker). The earpiece region 11 may be formed at an upper end of a touch sensitive panel. The earpiece region 11 should be able to detect the imprint of the user's ear against its surface. The region 11 includes one or more sensors for detecting proximity of an object, in this case the user's ear. These sensors may be based on resistive sensing, surface acoustic wave sensing, force sensing (e.g., strain gauge), optical sensing, and/or capacitive sensing. The sensors may be dispersed about the region 11. Each sensor may be represented by two or more coordinates, such as an x, y pair. In many cases, the sensors may be arranged in a grid of columns and rows. Position signals may be generated by the region 11 when, for example, a portion of the user's ear comes sufficiently close to or essentially contacts the grid of sensors, and then moves across the grid.

The user display region 12 may be part of a solid state display panel such as an LCD panel typically used in a communications handset. The user display region 12 may be in a separate physical component than the touch sensing panel in which the earpiece region 11 is formed.

Below the user display region 12 is a user input region 13 shown in this example as having a physical keypad that is typical for a cellular phone or smart phone. Below the user input region 13 at a lower end of the handset is a sound pickup surface 15. The sound pickup surface 15 may be part of, or may conceal behind it, a microphone 26 such as one that is used in a typical cellular phone or smart phone, to pick up the voice of a near end user during a two-way communications session (also referred to as a call).

The call allows the near end user to speak to and hear the voice of a far end user in real-time, over a communications network. The call may be a voice-only session, or it may be a video session (including both voice and images). In the example of FIG. 1, the call is identified by "connected" being displayed in the user display region 12, in association with the address of or an identification associated with the far end user (here a 10 digit telephone number) as well as the elapsed time. The communications session may be a wireless call, such as one that is performed by the handset 10 using a cellular network protocol or a wireless local area network protocol, while communicating with a base station in the network through a communication network interface 24 (see FIG. 2). The communication network interface 24 serves to interface downlink and uplink channel signals with a communications network, such as a cellular telephone network, a plain old telephone system network, or a wired local area network.

The audio communications device includes a downlink audio signal processor 23 (see FIG. 2) to generate a downlink channel audio receiver input signal that is converted to sound through the sound emitting surface 14 in the earpiece region 11. The input signal to the receiver 22 has characteristics that are governed by one or more audio processing parameters of the audio processor 23. Adjusting such parameters to increase intelligibility for the near end user affects the total power of the acoustic signal emitted from the sound emitting surface 14, as well as the distribution of the energy within its signal spectrum.

FIG. 1 shows that the touch sensing earpiece region 11 contains several touch-activated regions 16. In particular, in this example, there are three separate or isolated regions 16 that have been produced as a result of the earpiece region 11 being essentially in contact with portions of the near end user's ear during the call. Note, however, that this so-called imprint of the user's ear need not actually be displayed to the user—FIG. 1 only shows the touch activated regions 16 for purposes of understanding the invention.

The illustrated touch activated regions 16 are each examples of separate regions located around the sound emitting surface 14. The regions 16 are separate in that they are not linked, that is have no gaps or non-activated regions between them. In other words, each region 16 may be deemed an island. In most instances, the manner in which the user's ear contacts the ear piece region 11 produces several separate regions, rather than a single closed region around the sound emitting surface 14. However, it may be expected that where the user is pressing the handset 10 very strongly against her ear, a single closed region might be detected. The latter could be associated with the situation where the detected seal is considered to be very good or complete.

An acoustic leakage analyzer 28 that is coupled to the touch sensing ear piece region 11 analyzes sensor signals from the region 11, and in particular the pattern of the touch-activated regions 16, and on that basis adjusts one or more audio processing parameters. The parameters are automatically adjusted to compensate for acoustic leakage between the near end user's ear and the earpiece region. How and which audio processing parameters to adjust may be determined in advance. This may be based on, for example, laboratory experiments that evaluate the quality of the sound heard by the near end user (from the sound emitting surface 14) for different levels of acoustic leakage detected (using a touch sensing panel in which the earpiece region 11 is formed). Various instances of a near end user pressing the handset 10 against her ear can be tested. For each instance a suitable set of adjustments to one or more parameters can be selected and stored in the manufactured or end-user purchased specimens of the device.

The block diagram of FIG. 2 shows some additional relevant functional components of the communications device. An uplink audio signal processor 25 performs various conventional tasks on the uplink signal from the microphone 26 and then delivers an uplink channel audio signal to a communication network interface 24. It may also provide sidetone to the downlink processor 23. For the downlink channel, the downlink audio signal processor 23 receives a downlink channel signal from the communication network interface 24, containing the voice of the far end user, and processes that signal into an input audio signal to drive the receiver 22. The signal processors 23, 25 may include digital and analog circuit components, and may also include programmable circuitry as needed to produce a comfortable sound for the two-way communication session between the near end user and the far end user.

Figure 3:
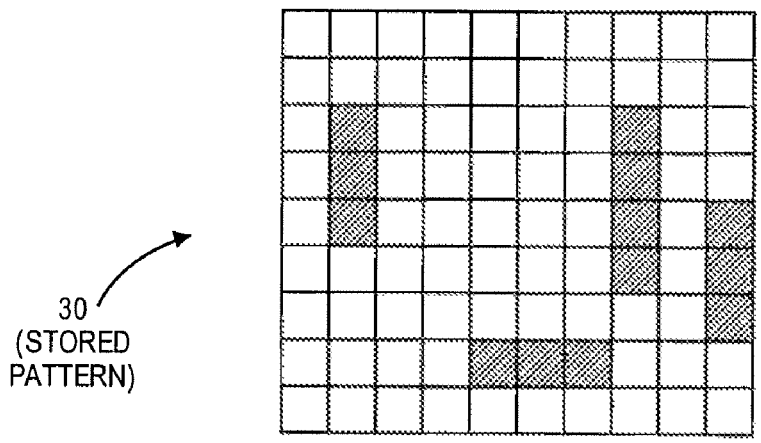
FIG. 3 depicts an example user ear imprint pattern that may be stored in the audio communications device, for use by an acoustic leakage analyzer.

The intelligibility of sound heard by the near end user may be improved as follows. First, the acoustic leakage analyzer 28 analyzes signals from the touch sensing earpiece region 11, which may indicate which portions of the region 11 have been activated due to essentially touch (which is also understood to include near touch), by the user's ear. The analyzer 28 detects one or more separate touch-activated regions 16 and may then compare these to a previously stored pattern to, for example, determine how well the earpiece region is sealed against the user's ear. FIG. 3 shows an example pattern 30, for example, in terms of activated squares or sensors in a grid representing the surface of the earpiece region 11, that may be stored in a memory of the device. A rough measure of the level of sealing achieved in a given instance may be the extent to which the active grid elements enclose or encircle the central region of the grid (where the sound emitting surface 14 is located). In addition, the enclosed area (or the roughly enclosed area) may indicate the size of the user's ear and therefore the volume of an acoustic cavity that is formed in front of the earpiece region 11. Depending upon the experimental results, certain arrangements of active grid elements may be found to represent better acoustic seal conditions. Such findings could be stored in the communications device, readily accessible by the acoustic leakage analyzer 28 in real time so that the audio parameters of the downlink audio signal processor 23 may be updated dynamically during a call, as the user's ear seal level changes as the user repositions the handset 10 against her ear.

Another factor that may be used by the acoustic leakage analyzer 28 (to determine how to essentially dynamically tune the frequency content and total power of the sound emitted from the earpiece region) is a measure of how hard the user is pushing the handset 10 against her ear. This factor may help indicate, for example, the depth of the acoustic cavity formed in front of the earpiece region. A pressure sensor (pressure or force transducer such as a strain gauge) may be incorporated into the housing of the handset 10, e.g. on the front face, or on the back face where the user grips the handset 10, to provide a measure of the physical force generated by the user pressing the handset 10 against her ear.

Figure 4:
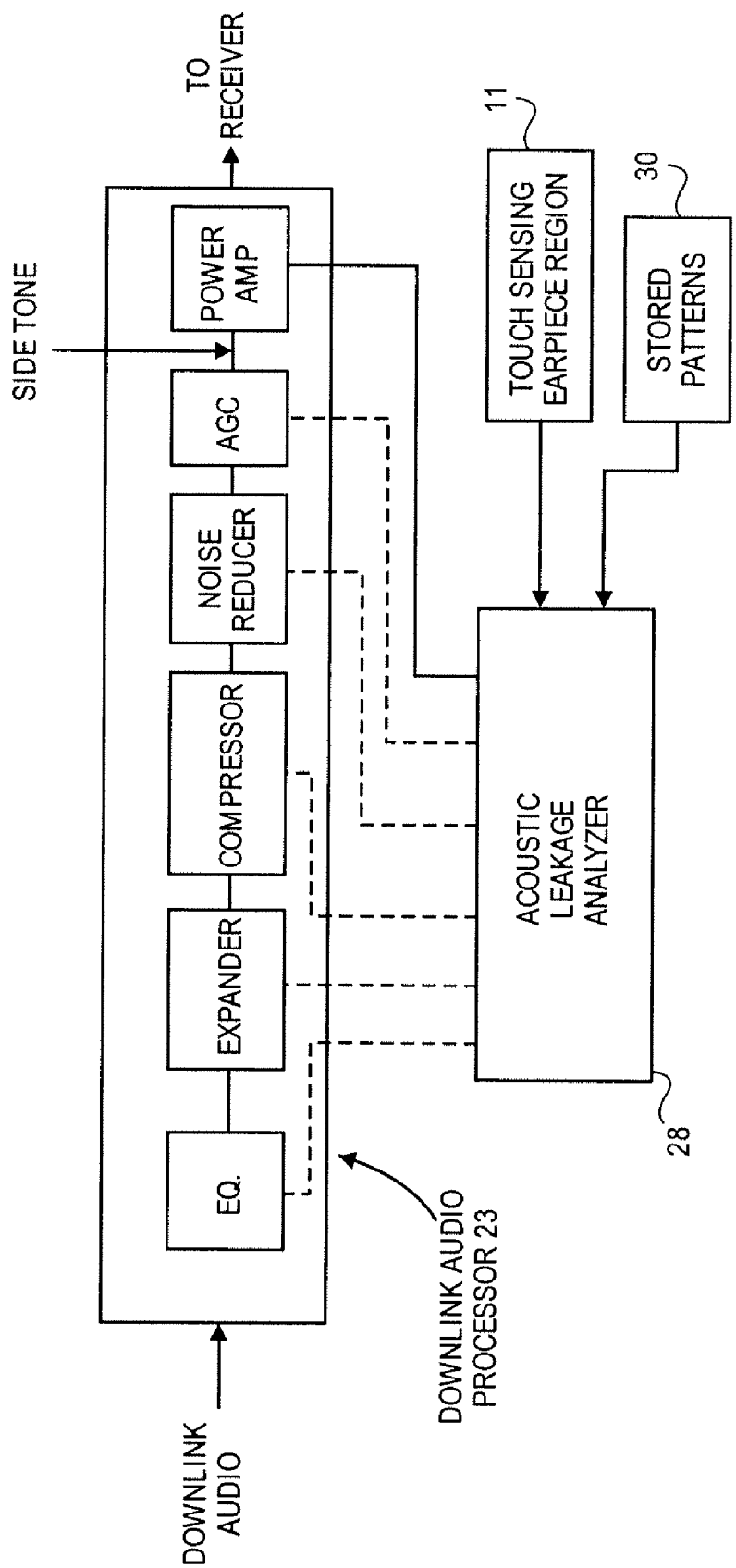
FIG. 4 is a block diagram of relevant functional components of the audio communications device, and, in particular, an example set of audio processing components that may be controlled by the acoustic leakage analyzer

Once an estimated level of acoustic leakage has been determined, the acoustic leakage analyzer 28 may compensate for the acoustic leakage using any one or more of several conventional techniques. Referring now to FIG. 4., an example set of audio processing components (as part of the downlink audio processor 23) that may be adjusted by the acoustic leakage analyzer 28 are shown. The audio processor 23 in this instance contains a chain of components or stages that operate on the downlink channel audio signal (together with a sidetone signal), to produce an input signal for driving the receiver 22. In this example, the audio processor 23 includes an equalization block, an expander block, a compressor block, a noise reducer block, a gain setting unit, an automatic gain control (AGC) block, and a power amplifier block. Changing the loudness or volume of the receiver sound output may be performed by signaling the power amplifier; tuning an audio frequency response parameter to modify overall frequency response may be obtained by signaling any one or more of the equalization, compander (expander and compressor), noise reducer, and AGC blocks. Note that changing one or more of these audio processing parameters may generally be expected to result in changing both the sound pressure level and the frequency content or spectral characteristics of the acoustic output of the receiver (which is delivered to the user's ear from the sound emitting surface 14). In one example, a parameter of the equalization block and/or the expander block may be adjusted so as to boost a frequency response range that is below one kHz, relative to a frequency response range that is above one kHz. It has been found that this lower frequency range suffers more than the upper frequency range as the acoustic seal worsens. Other parameter adjustments are possible. Also, note that not all of the audio processing components depicted in FIG. 4 are needed to provide the user with a comfortable sound in every instance.

Figure 5:
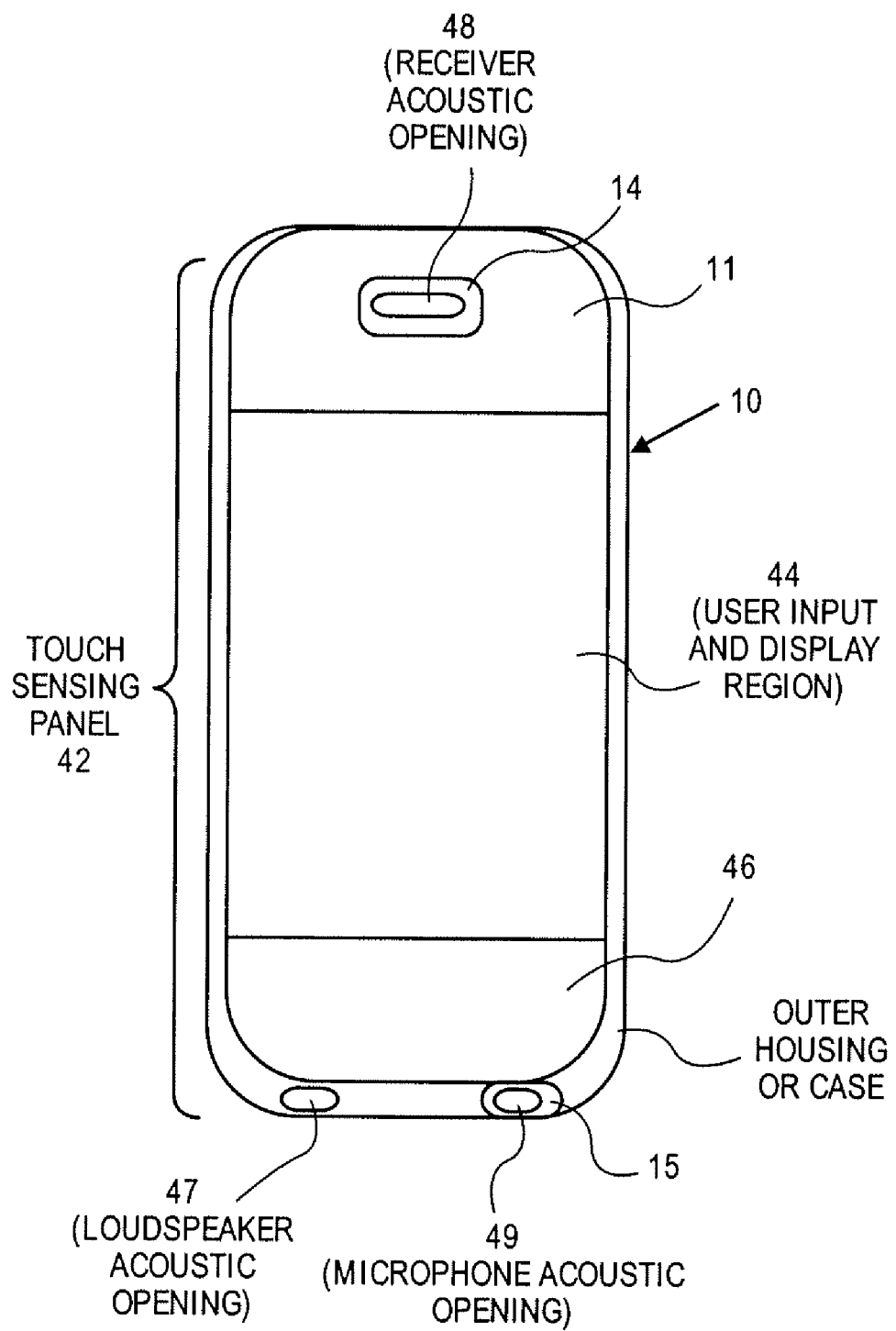
FIG. 5 depicts another embodiment of the audio communications device, where a touch sensing panel extends from a lower end portion to an upper end portion of the handset.

Turning now to FIG. 5., another embodiment of the audio communications device is shown, where in this case a touch sensing panel 42 extends from a lower end portion 46 to an upper end portion (being the ear piece region 11) of the outer housing or case of the handset 10. This is contrast to the embodiment of FIG. 1 where the touch sensing panel may be confined to just the ear piece region 11 at the upper end portion of the handset 10. Another difference is that the user input region 13 of FIG. 1 is implemented as a set of virtual keypad components in the user input and display region 44 of the touch panel 42. In FIG. 5, the sound emitting surface 14 which is in the ear piece region 11 encompasses a receiver acoustic opening 48 that may be formed through the touch sensing panel 42. The user input and display region 44 is formed within the touch sensing panel 42, in effect replacing the user display region 12 and the user input region 13 of the embodiment of FIG. 1. The virtual telephone keypad may appear when a telephony application has been launched by the user of the handset 10. In addition, in the embodiment of FIG. 5, the sound pickup surface 15 is formed not on the front face but on a side of the outer housing or case, encompassing a microphone acoustic opening 49 as shown. The outer housing or case in this case also includes a loud speaker acoustic opening 47 which would be used for playing sounds though a speaker phone function of the handset 10.

To conclude, various aspects of a technique for dynamically (automatically) adjusting one or more audio parameters of a communications device to compensate for acoustic leakage have been described. It should be noted that the functional components described above may be arranged in different physical forms, for purposes of improving the manufacturability or other practical considerations. Several functional components may be integrated into a single integrated circuit (IC) chip or package, while a single functional component could be distributed across multiple IC chips or packages. For example, the acoustic leakage analyzer 28 may be implemented as a programmed applications processor (AP) that is integrated in the handset 10; some of the audio processing components shown in FIG. 4 could be implemented in a programmed cellular or wireless communications baseband processor, while others such as the power amplifier could be part of a separate audio codec chip.

An embodiment of the invention may also be in the form of a machine-readable medium having stored thereon instructions which program one or more processors that make up the audio communications device, to perform some of the operations described above, such as detecting touch sensed imprints of the user's ear and adjusting audio processing parameters to compensate for acoustic leakage. In other embodiments, some of these operations might be performed by specific hardware components that contain hardwired logic. Those operations might alternatively be performed by any combination of programmed data processing components and fixed hardware circuit components.

A machine-readable medium may include any mechanism for encoding or storing information in a form readable by a machine (e.g., a computer), such as Compact Disc Read-Only Memory (CD-ROMs), Read-Only Memory (ROMs), Random Access Memory (RAM), and Erasable Programmable Read-Only Memory (EPROM).

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although the discussion above focuses on a call between a near end user and a far end user, the call could also include additional participants (such as in a multi-party conference call) whose voice signals would be mixed into the downlink channel of the near end user. Also, although the touch sensing region 11 is shown as being essentially flat, an alternative would be to have one or more curved portions therein. Finally, although two different versions of a handset 10 are shown in FIG. 1 and in FIG. 5, the invention may also be implemented in other types of handsets, such as cellular phone handsets that have a clamshell type structure. The description is thus to be regarded as illustrative instead of limiting.

What is claimed is:

1. A machine-implemented method for operating an audio communications device, comprising:

during a call that is being performed using the audio communications device, automatically detecting an imprint of a user's ear against a region around a sound emitting surface of the device using a touch sensing surface, and adjusting an audio processing parameter of the device based on said detection to compensate for acoustic leakage between the user's ear and the region around the sound emitting surface wherein said adjusting an audio processing parameter of the device comprises adjusting a plurality of parameters of an audio signal processor whose input is to receive a downlink audio signal and a sidetone signal, to change sound pressure level and spectral content of an acoustic signal that is delivered to the user's ear.

2. The method of claim 1 wherein said detecting comprises:

detecting a plurality of separate touch-activated regions around the sound emitting surface, each of the separate regions being contiguous.

3. The method of claim 1 wherein said adjusting a plurality of parameters comprises one of:

adjusting a gain setting unit;
adjusting an automatic gain control (AGC) unit;
adjusting an equalization filter;
adjusting a noise suppressor or noise canceller;
adjusting a compander;
adjusting a compressor; and
adjusting an expander.

4. The method of claim 1 wherein said adjusting a plurality of parameters comprises:

boosting a frequency response range that is below 1 kHz, relative to a frequency response range that is above 1 kHz, when compensating for a transition from a more sealed condition to a less sealed condition.

5. The method of claim 1 wherein said adjusting a plurality of parameters comprises:

cutting back a frequency range that is below 1 kHz, relative to a frequency response range that is above 1 kHz, when compensating for a transition from a less sealed condition to a more sealed condition.

* * * * *